(12) United States Patent
Rasenberger et al.

(10) Patent No.: US 11,841,433 B2
(45) Date of Patent: Dec. 12, 2023

(54) METHOD AND APPARATUS FOR DETERMINING AT LEAST ONE SPATIAL POSITION AND ORIENTATION OF AT LEAST ONE TRACKED MEASURING DEVICE

(71) Applicant: Carl Zeiss Industrielle Messtechnik GmbH, Oberkochen (DE)

(72) Inventors: Volker Rasenberger, Raubling (DE); Wolfgang Hoegele, Rosenheim (DE); Florian Rettich, Munich (DE); Thomas Mayer, Kolbermoor (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 542 days.

(21) Appl. No.: 16/749,903

(22) Filed: Jan. 22, 2020

(65) Prior Publication Data

US 2020/0233086 A1 Jul. 23, 2020

(30) Foreign Application Priority Data

Jan. 22, 2019 (DE) ...................... 10 2019 200 733.3

(51) Int. Cl.
*G01S 17/00* (2020.01)
*G01S 17/66* (2006.01)
(Continued)

(52) U.S. Cl.
CPC .............. *G01S 17/66* (2013.01); *G01S 7/003* (2013.01); *G01S 17/74* (2013.01)

(58) Field of Classification Search
USPC ........................................................ 356/5.01
See application file for complete search history.

(56) References Cited

U.S. PATENT DOCUMENTS

| 7,688,802 B2 * | 3/2010 | Gonia ................... H04J 3/0641 370/328 |
| 8,502,991 B2 * | 8/2013 | Daxauer .............. G01B 21/045 356/620 |

(Continued)

FOREIGN PATENT DOCUMENTS

| CN | 102118849 A | 7/2011 |
| CN | 102355319 A | 2/2012 |

(Continued)

OTHER PUBLICATIONS

Benham Behroozpur Baghmisheh, Chip-scale Lidar, Technical Report No. UCB/EECS.2017-4 (2017).

*Primary Examiner* — James R Hulka
(74) *Attorney, Agent, or Firm* — Ewers IP Law PLLC; Falk Ewers

(57) ABSTRACT

An apparatus for determining a spatial position and orientation of a tracked measuring device includes a light detection and ranging (LIDAR) unit having at least one measurement channel configured to generate at least one measurement signal, and a control and evaluation unit including a reception unit configured to receive data from the tracked measuring device in wireless fashion, the LIDAR unit being configured to generate a LIDAR signal for the at least one measurement signal and to transfer said LIDAR signal to the control and evaluation unit, the apparatus having a synchronization channel integrated at least in part into the measurement channel of the LIDAR unit and configured to determine a synchronization information item, and the control and evaluation unit being configured to temporally synchronize the data of the tracked measuring device and the LIDAR signal by taking into account the at least one synchronization information item.

10 Claims, 2 Drawing Sheets

(51) Int. Cl.
    *G01S 17/74*    (2006.01)
    *G01S 7/00*    (2006.01)

(56) References Cited

U.S. PATENT DOCUMENTS

| | | | |
|---|---|---|---|
| 8,913,636 B2 | 12/2014 | Roos et al. | |
| 9,559,486 B2 | 1/2017 | Roos et al. | |
| 10,219,866 B2 * | 3/2019 | Bodjanski | G06T 7/90 |
| 10,247,538 B2 * | 4/2019 | Roos | H04B 10/071 |
| 2009/0267895 A1 * | 10/2009 | Bunch | G06F 3/03543 |
| | | | 345/157 |
| 2009/0290572 A1 | 11/2009 | Gonia et al. | |
| 2011/0007326 A1 | 1/2011 | Daxauer et al. | |
| 2011/0267431 A1 | 11/2011 | Steinbichler et al. | |
| 2012/0106579 A1 * | 5/2012 | Roos | H01S 3/1305 |
| | | | 372/20 |
| 2013/0050410 A1 | 2/2013 | Steinbichler et al. | |
| 2015/0071315 A1 * | 3/2015 | Roos | H01S 5/141 |
| | | | 372/20 |
| 2016/0123718 A1 | 5/2016 | Roos et al. | |
| 2017/0258531 A1 | 9/2017 | Bodjanski | |
| 2018/0233145 A1 * | 8/2018 | Bathiche | H04N 5/332 |
| 2019/0258864 A1 * | 8/2019 | Lee | G06T 11/206 |
| 2019/0302261 A1 * | 10/2019 | Fleischer | G01S 17/894 |
| 2019/0391244 A1 * | 12/2019 | Sekiguchi | G01S 17/46 |

FOREIGN PATENT DOCUMENTS

| | | | |
|---|---|---|---|
| CN | 102811480 A | | 12/2012 |
| CN | 105548197 A | * | 5/2016 |
| DE | 102010018979 A1 | | 11/2011 |
| DE | 112012001709 T5 | * | 1/2014 |
| DE | 102017006846 A1 | * | 1/2018 |
| DE | 102016214030 A1 | * | 2/2018 |
| DE | 102018222718 A1 | * | 6/2020 |
| EP | 2801841 A1 | * | 11/2014 |

* cited by examiner

METHOD AND APPARATUS FOR DETERMINING AT LEAST ONE SPATIAL POSITION AND ORIENTATION OF AT LEAST ONE TRACKED MEASURING DEVICE

CROSS REFERENCE TO RELATED APPLICATIONS

This application claims priority to German patent application DE 10 2019 200 733.3, filed Jan. 22, 2019, the entire content of which is incorporated herein by reference.

TECHNICAL FIELD

The disclosure relates to an apparatus for determining at least one spatial position and orientation of at least one tracked measuring device and to a method for determining at least one spatial position and orientation of at least one tracked measuring device. In particular, the present disclosure relates to the field of coordinate measuring technology, for example for measuring components.

BACKGROUND

In the field of measuring test objects, for example components, measuring methods are usually used, in which a measuring head of a measurement system probes a test object and the measuring head is positioned and aligned in a measurement volume by a distance measuring apparatus and an additional angle measuring apparatus.

In the case of continuous measuring of a position and orientation, so-called tracking, of the measurement system that is freely movable in space, such measurement systems often can only capture part of the test object at the same time, for example a two-dimensional line in the case of a laser line scanner. In order to obtain the entire geometry, the individual detections can be composed. However, a precondition for this is a temporal relationship between the measurement system and the distance measuring apparatus and/or the additional angle measuring apparatus. In the case of wired laser line scanners, this can be implemented, for example, by distributed clocks with an accuracy of less than one microsecond.

Wireless laser line scanners have significant advantages during their application. DE 10 2010 018 979 A1 describes a method for determining the 3D coordinates of the surface of an object, in which the surface of the object is scanned by a scanner for the purposes of obtaining object data. The position and orientation of the scanner for obtaining position and orientation data is determined, in particular by a tracking system. The object data and the position and orientation data are transmitted to a controller, which determines the 3D coordinates of the surface of the object therefrom. In order to improve such a method, the object data are transmitted wirelessly from the scanner to the controller. However, a temporal accuracy of the wired embodiments could not yet be achieved.

Further, methods for a wireless data transfer in a network are known, for example from US 2009/0290572 A1, CN 102355319 A, CN 102118849 A, and CN102811480 A. An implementation of such transfers, however, requires additional components and is expensive.

SUMMARY

It is therefore an object of the present disclosure to provide an apparatus and a method for determining at least one spatial position and orientation of at least one tracked measuring device, which at least largely avoid the disadvantages of known apparatuses and methods. In particular, at least one spatial position and orientation of at least one tracked measuring device should be determined with less complexity and inexpensively.

This object is achieved by an apparatus for determining at least one spatial position and orientation of at least one tracked measuring device and a method for synchronizing data of at least one tracked measuring device and at least one light detection and ranging (LIDAR) signal of a LIDAR unit tracking the tracked measuring device as described herein.

Hereinafter the terms "exhibit", "have", "comprise" or "include" or any grammatical deviations therefrom are used in a non-exclusive way. Accordingly, these terms can refer either to situations in which, besides the feature introduced by these terms, no further features are present, or to situations in which one or more further features are present. By way of example, the expression "A exhibits B", "A has B", "A comprises B" or "A includes B" can refer either to the situation in which, apart from B, no further element is present in A (i.e., to a situation in which A exclusively consists of B), or to the situation in which, in addition to B, one or more further elements are present in A, for example element C, elements C and D, or even further elements.

Furthermore, it is pointed out that the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "typically", "in particular", "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the disclosure, as will be recognized by a person skilled in the art, can also be carried out using other configurations. Similarly, features introduced by "in one embodiment of the disclosure" or by "in one exemplary embodiment of the disclosure" are understood as optional features, without alternative configurations or the scope of protection of the independent claims thereby being intended to be restricted. Furthermore, all possibilities of combining the features introduced by these introductory expressions with other features, whether optional or non-optional features, are intended to remain unaffected by said introductory expressions.

According to a first aspect of the present disclosure, an apparatus for determining at least one spatial position and orientation of at least one tracked measuring device is provided.

In the context of the present disclosure, a tracked measuring device or measuring apparatus can be understood to mean any apparatus that is configured to scan a surface of an object to be measured, for example a component. The measuring apparatus may include at least one sensor, which is configured to determine the 3D coordinates of the surface. The measuring apparatus may include at least one scanner, more particularly a line scanner. The measuring apparatus may be a hand-guided measuring apparatus.

"Tracking" can be understood to mean following a movement of the measuring apparatus at various times. In particular, there can be a continuous measurement of a 6D information item, i.e., the spatial position and orientation, of the measuring apparatus that is movable in space.

The measuring apparatus may include at least three retroreflectors. A retroreflector can be understood to mean an apparatus that reflects an incident light beam. By way of example, the retroreflector can be a marker. By way of example, the retroreflector can be selected from the group consisting of: a cat's eye, spherical lenses with a reflection layer, a marker as described in US 2011/0007326 A1, US 2013/0050410 A1, or US 2017/0258531 A1, the content of which is herewith incorporated into this application, a cube prism, a corner cube. The retroreflectors can be arranged on the measuring apparatus in secured and/or inter-changeable fashion. A position of the retroreflectors on the measuring apparatus can be known. The measuring apparatus may include a plurality of retroreflectors, in particular more than three retroreflectors, for example four, five, six, or more retroreflectors.

The spatial position and the orientation can be determined in a coordinate system, for example a Cartesian coordinate system or a spherical coordinate system. Other coordinate systems are also conceivable. An origin or zero of the coordinate system can be at a point of the apparatus. A spatial position can be understood to mean a three-dimensional point (X, Y, Z) in the coordinate system, in particular a position of the measuring apparatus. An orientation can be understood to mean an alignment of the measuring apparatus, in particular an angular position in the measurement volume. The orientation can be specified by at least three angles, for example a Euler angle or inclination angle, a roll angle, and a yaw angle.

According to an aspect of the disclosure, the apparatus includes at least one LIDAR unit and at least one control and evaluation unit. The LIDAR unit has at least one measurement channel. The measurement channel is configured to generate at least one measurement signal. The LIDAR unit is configured to generate at least one LIDAR signal for the measurement signal and to transfer said at least one LIDAR signal to the control and evaluation unit. The control and evaluation unit includes at least one reception unit, which is configured to receive data from the tracked measuring device in wireless fashion. The apparatus has at least one synchronization channel. The synchronization channel is integrated, at least in part, in the measurement channel of the LIDAR unit. The synchronization channel is configured to determine at least one synchronization information item. The control and evaluation unit is configured to temporally synchronize the data of the tracked measuring device and the LIDAR signal, taking account of the synchronization signal.

A LIDAR unit can be understood to mean an apparatus that is based on the LIDAR measurement principle, which is also referred to as "laser detection and ranging" (LADAR). The LIDAR unit may also include at least one illumination apparatus, which is configured to generate at least one frequency modulated illumination light beam, a so-called "frequency modulated continuous wave" (FMCW). The LIDAR unit can be configured to generate the illumination light beam, the frequency of which is tuned continuously, according to the FMCW method. By way of example, the frequency of the illumination light beam can be linearly modulated with time. In principle, a combination of LIDAR method and FMCW method is known to a person skilled in the art, for example from Chipscale Lidar, Benham Behroozpur Baghmisheh, Technical Report No. UCB/EECS.2017-4. By way of example, the LIDAR unit can be configured like in U.S. Pat. No. 9,559,486 B2, U.S. Pat. No. 8,913,636 B2, or US 2016/123718 A1.

The LIDAR unit has at least one measurement channel. A "measurement channel" can be understood to mean an element of the LIDAR unit, which is configured to illuminate at least one retroreflector with at least one portion of the illumination light beam and to capture at least one beam reflected by the at least one retroreflector. The LIDAR unit can have a plurality of measurement channels, for example two, three, four, five, or more measurement channels. The measurement channels can be configured identically or differently. The measurement channels can be configured at least partly separated from one an-other in space and/or time. "At least partly separated in space" can be understood to mean that spatially non-separated portions of the measurement channels are possible, wherein at least one portion of the respective measurement channels is separated from the other measurement channels in space. Here, "at least partly separated in time" can be understood to mean that the measurement channels are operated at different times, with a time overlap being possible.

The measurement channel can have at least one optical fiber, in particular at least one monomode fiber and/or at least one multimode fiber.

The measurement channel can have at least one optical unit in each case, which is configured to expand a light beam into a solid angle such that the at least three retroreflectors are irradiated. By way of example, the measurement channel can have a wide-angle lens. The optical unit can have at least one converging lens or a concave lens. Typically, use can be made of a converging lens, which facilitates an approximately tilted plane wavefront at the retroreflector and good efficiency during the input coupling at the focus. Each retroreflector can send back some of the light beam incident thereon.

The measurement channel is configured to generate at least one measurement signal. A measurement signal can be understood to mean a signal that is reflected by at least one retroreflector, in particular a reflected light beam. The measurement signal of the measurement channel can be an output light beam of the measurement channel. The LIDAR unit may include at least one sensor element, which is configured to detect the measurement signal of the measurement channel, in particular to detect the measurement signals of the measurement channels in the case of a plurality of measurement channels. "Detecting the measurement signals of the measurement channels" can be understood to mean detecting the individual measurement signals and/or detecting the superposed measurement signals of the measurement channels. In the context of the present disclosure, a "sensor element" can be understood to mean any apparatus that is configured to receive the measurement signals of the measurement channels. The sensor element can have at least one photo diode.

The LIDAR unit is configured to generate at least one LIDAR signal for the measurement signal. In particular, the LIDAR unit is configured to produce at least one LIDAR signal for each measurement channel. The LIDAR unit can be configured to generate a reference light beam. The LIDAR unit can include at least one reference arm. The reference light beam can be a current illumination light beam which is supplied to the sensor element via the reference arm of the LIDAR unit, for example. The sensor element can be configured to superpose the measurement signals of the measurement channels on the reference light beam. A "LIDAR signal" can be understood to be a signal of the LIDAR unit, which has at least one information item about a frequency difference, also referred to as frequency delta, between the reference light beam and measurement signal. The LIDAR signal can be a signal in which the reference light beam is superposed on the measurement signal of the measurement channel. The LIDAR signal can be a signal in which the reference light beam is superposed on the measurement signals of the measurement channels. The LIDAR signal can be a frequency spectrum of a beat signal of the reference light beam, on which the measurement signals have been superposed. The LIDAR unit can be configured to super-pose the reference light beam on at least one measurement signal and determine a frequency spectrum of an arising beat signal. In the case of a plurality of measurement channels, the LIDAR unit can be configured to superpose the reference light beam on the superposed measurement signals and determine a frequency spectrum of an arising beat signal. The LIDAR unit can be configured to determine at least three peaks in the frequency spectrum for each retroreflector and determine the spatial position and orientation of the measuring apparatus therefrom.

The apparatus includes at least one control and evaluation unit. The control and evaluation unit can be configured to determine the spatial position and orientation of the measuring apparatus from the LIDAR signal. Here, a "control and evaluation unit" can be understood, in general, to mean an electronic apparatus configured to evaluate signals generated by the measurement channel, in particular the sensor element, and to control at least one process of the apparatus. By way of example, one or more electronic connections between the measurement channel, in particular the sensor element, and the control and evaluation unit can be provided for this purpose. The control and evaluation unit can include for example at least one data processing apparatus, for example at least one computer or microcontroller. The data processing apparatus can have one or more volatile and/or non-volatile data memories, wherein the data processing apparatus can be configured for example in terms of programming to drive the sensor element. The control and evaluation unit can furthermore include at least one interface, for example an electronic interface and/or a human-machine interface such as, for example, an input/output apparatus such as a display and/or a keyboard. The control and evaluation unit can be constructed for example centrally or else in a decentralized manner. Other configurations are also conceivable. The control and evaluation unit can include at least one A/D converter.

The control and evaluation unit can be configured to determine the spatial position and orientation of the measuring apparatus from the LIDAR signal. The control and evaluation unit can be configured to determine a frequency spectrum of the LIDAR signal, in particular the beat signal, by a Fourier transform. The frequency spectrum can have a plurality of maxima, so-called peaks. The control and evaluation unit can be configured to identify the peaks in the frequency spectrum. A spatial position of the three retroreflectors can be determined from the information items about the exact distribution and/or arrangement of the peaks. A 3D point can be determined from three lengths in different directions. A complete 6D information item can be determined in the case of a known arrangement of the retroreflectors on the measuring apparatus.

The LIDAR unit is configured to transfer the LIDAR signal to the control and evaluation unit. "Transferring" can be understood to mean a transmitting and/or transferring and/or sending. By way of example, for this purpose provision can be made of one or more connections, in particular wired and/or wireless connections, between the LIDAR unit and the control and evaluation unit. The data transfer between the control and evaluation unit and the LIDAR unit can be bidirectional. The control and evaluation unit and/or the LIDAR unit may include at least one transmission apparatus and/or at least one reception unit.

The tracked measuring device may be configured to transmit data, in particular captured object data, to the control and evaluation unit. The measuring apparatus may include, for example, at least one transmission apparatus, which is configured to transmit data to the control and evaluation unit. The control and evaluation unit includes the at least one reception unit, which is configured to receive data from the tracked measuring device in wireless fashion. The tracked measuring device may include the at least one transmission apparatus, which is configured for wireless data transfer. The wireless data transfer may use any wireless data transfer method, for example Bluetooth, Wireless Local Area Network (WLAN), LTE, Long Term Evolution (4G), Next Generation Mobile Networks (5G). By way of example, the data transfer can be realized by conventional WLAN component parts. The data transfer between the control and evaluation unit and the tracked measuring device can be bidirectional. Thus, the control and evaluation unit may include at least one transmission apparatus and the tracked measuring device may include at least one reception unit.

The apparatus has at least one synchronization channel. A "synchronization channel" can be understood to mean an information channel, in particular an optical channel, which is configured to synchronize the data of the tracked measuring device and of the LIDAR signal. "Synchronizing" can be understood to mean determining a temporal relationship. The synchronization channel can use at least one light beam with a wavelength in the optical spectrum. The synchronization channel is integrated, at least in part, in the measurement channel of the LIDAR unit. "At least partial integration" can be understood to mean that the synchronization channel uses at least one optical component of the measurement channel, more particularly uses at least one optical component of at least one of the measurement channels in the case of a plurality of measurement channels. In particular, the synchronization channel and the measurement channel may have an at least partly identical light path. In the case of a plurality of measurement channels, the synchronization channel and at least one of the measurement channels may have an at least partly identical light path. An "at least partly identical light path" can be understood to mean both embodiments in which the light paths are completely identical and embodiments in which at least the light path from the tracked measuring device to the LIDAR unit is identical. By way of example, the synchronization channel can be fully integrated into at least one of the measurement channels. The synchronization channel is configured to determine at least one synchronization information item. A "synchronization information item" can be understood to mean an information item about a temporal relationship between the data of the tracked measuring device, in particular data acquisition by the tracked measuring device, and the LIDAR signal.

By way of example, the synchronization information item may include an information item about a modulation of at least one illumination light beam. An "illumination light beam" can be understood to mean a light beam that is configured to illuminate the tracked measuring device. By way of example, the illumination light beam can be an illumination light beam of the LIDAR unit. The LIDAR unit can have at least one illumination apparatus. An "illumination apparatus" can be understood to mean an apparatus configured to generate a light beam. In the context of the present disclosure, "light" can be understood to mean electromagnetic radiation in at least one spectral range selected from the visible spectral range, the ultraviolet spectral range and the infrared spectral range. The term visible spectral range encompasses, in principle, a range of 380 nm to 780 nm. The term infrared (IR) spectral range encompasses, in principle, a range of 780 nm to 1000 µm, wherein the range of 780 nm to 1.4 µm is designated as near infrared (NIR), and the range of 15 µm to 1000 µm is designated as far infrared (FIR). The term ultraviolet encompasses, in principle, a spectral range of 100 nm to 380 nm. IR light, that is to say light from the infrared spectral range, is typically used in the context of the present disclosure. The term "light beam" can be understood to mean, in principle, a quantity of light which is emitted and/or radiated in a specific direction. The illumination apparatus can have at least one light source. An "illumination light beam of the LIDAR unit" can be understood to mean an illumination light beam which has a modulated frequency, e.g., linearly modulated frequency, and which is at least partly couplable into the measurement channel or the measurement channels. The illumination apparatus can have at least one FMCW light source. The illumination apparatus can have at least one adjustable (tuneable) laser source, for example at least one distributed feedback (DFB) laser diode or a distributed Bragg reflector (DBR) laser diode.

The illumination apparatus can be configured to generate the at least one illumination light beam. The LIDAR unit can have at least one modulation unit, which is configured to modulate the illumination light beam. By preference, the modulation can be an amplitude modulation. The apparatus can include at least one detector, for example at least one photodetector. The at least one detector can be arranged on the tracked measuring device, in particular on a surface of the tracked measuring device. The detector can be configured to determine the information item about modulation of the illumination light beam. Since the LIDAR unit attempts to direct the illumination light beams of the LIDAR unit exactly on the tracked measuring device, an optimal signal-to-noise ratio for determining the information item about the modulation of the illumination light beam can be ensured without further measures.

As an alternative or in addition thereto, the illumination light beam can be at least one separate light beam that has an identical light path as the illumination light beam of the LIDAR unit. The separate light beam can have an identical wavelength or a different wavelength in relation to the illumination light beam of the LIDAR unit, said illumination light beam also be referred to as measurement beam. In this embodiment, light beams of a separate illumination apparatus that use the same light path to the tracked measuring device can be modulated. Using an identical light path can be advantageous since the determination of the synchronization information item may profit from beam tracking by the LIDAR unit. This can guarantee an optimal signal quality.

As an alternative or in addition thereto, the synchronization information item may include an information item about a modulation of at least one light beam propagating from the tracked measuring device to the LIDAR unit. The apparatus can have a plurality of further illumination devices, which are arranged on the tracked measuring device. The further illumination devices can be configured to generate a plurality of light beams propagating from the tracked measuring device to the LIDAR unit. The LIDAR unit can be configured to receive the plurality of light beams propagating from the tracked measuring device to the LIDAR unit and to determine the information item about a modulation of the light beams propagating from the tracked measuring device to the LIDAR unit. By way of example, the further illumination devices can be arranged in such a way that at least one illumination apparatus is captured in every trackable alignment of the tracked measuring device. An emission angle can be chosen in such a way that light from at least one of the further illumination devices is captured in every trackable alignment of the tracked measuring device. The light beams generated by the further illumination devices of the tracked measuring device may use the same the light path from the tracked measuring device to the LIDAR unit as the light beams reflected by the retroreflectors. In this way, it is possible to profit from the beam tracking by the LI-DAR unit. In the LIDAR unit, the light beams generated by the further illumination devices of the tracked measuring device can be captured by the above-described sensor elements of the LIDAR unit, in particular at an identical wavelength as the illumination light beams of the LIDAR unit, or by further separate detectors. The plurality of light beams propagating from the tracked measuring device to the LIDAR unit can have identical or different wavelengths and/or the plurality of light beams propagating from the tracked measuring device to the LIDAR unit can have an identical wavelength or different wavelengths to the illumination light beam of the LIDAR unit.

As an alternative or in addition thereto, the tracked measuring device may include a plurality of modulable markers. The modulable markers may each be configured to influence a light beam reflected to the LIDAR unit from the respective modulable marker in such a way that a temporal relationship between the LIDAR unit and tracked measuring device is generated. A "modulable" marker can be understood to mean a marker in which at least one property, in particular a reflection property, is adjustable, for example by covering. The modulable markers can each be configured to influence the light beam reflected to the LIDAR unit from the respective modulable marker in such a way that a number and/or quality of the measurements of markers by the LIDAR unit changes. The number of modulable markers can be such that it is possible to ensure that at least one modulable marker can be captured in any alignment of the tracked measuring device. This allows a measurement of markers by the LIDAR unit to be influenced in a targeted fashion by the tracked measuring device. This allows a common temporal relationship between the LIDAR unit and the tracked measuring device to be established. An accuracy of the temporal relationship can depend on a measurement rate of the LIDAR unit.

According to a further aspect of the disclosure, a method for synchronizing data of at least one tracked measuring device and at least one LIDAR signal of a LIDAR unit tracking the tracked measuring device is provided. In the method, use is made of an apparatus with at least one LIDAR unit according to any one of the exemplary embodiments described above or below that relate to an apparatus for determining at least one spatial position and orientation of at least one tracked measuring device. The method includes the following steps:

a) generating at least one measurement signal with at least one measurement channel of the LIDAR unit in each case, b) generating at least one LIDAR signal for the measurement signal and transferring the LIDAR signal to a control and evaluation unit,
c) wirelessly receiving data from the tracked measuring device with the control and evaluation unit,
d) generating at least one synchronization signal, which is integrated at least in part in the at least one measurement channel of the LIDAR unit, and
e) temporally synchronizing the data of the tracked measuring device and of the LIDAR signal with the control and evaluation unit, taking account of the synchronization signal.

In this case, the method steps can be carried out in the order specified, wherein one or more of the steps can at least partly also be carried out simultaneously and wherein one or more of the steps can be multiply repeated. Furthermore, further steps can additionally be performed independently of whether or not they are mentioned in the present application. For details in respect of the method according to the aspects of the disclosure, reference is made to the description of the apparatus.

Furthermore, the method can include determining the spatial position and orientation of the tracked measuring device.

In summary, in the context of the present disclosure, the following exemplary embodiments are typical:

Exemplary embodiment 1: Apparatus for determining at least one spatial position and orientation of at least one tracked measuring device, wherein the apparatus includes at least one LIDAR unit, wherein the apparatus includes at least one control and evaluation unit, wherein the LIDAR unit has at least one measurement channel, wherein the measurement channel is configured to generate at least one measurement signal, wherein the LIDAR unit is configured to generate at least one LIDAR signal for the measurement signal and to transfer said LIDAR signal to the control and evaluation unit, wherein the control and evaluation unit includes at least one reception unit, which is configured to receive data from the tracked measuring device in wireless fashion, wherein the apparatus has at least one synchronization channel, wherein the synchronization channel is integrated at least in part into the at least one measurement channel of the LIDAR unit, wherein the synchronization channel is configured to determine at least one synchronization information item, wherein the control and evaluation unit is configured to temporally synchronize the data of the tracked measuring device and the LIDAR signal, taking account of the synchronization information item.

Exemplary embodiment 2: Apparatus according to the preceding exemplary embodiment, wherein the synchronization information item includes an information item about a modulation of at least one illumination light beam.

Exemplary embodiment 3: Apparatus according to the preceding exemplary embodiment, wherein the illumination light beam is an illumination light beam of the LIDAR unit and/or wherein the illumination light beam is separate light beam, which has an identical light path to the illumination light beam of the LIDAR unit.

Exemplary embodiment 4: Apparatus according to the preceding exemplary embodiment, wherein the separate light beam has an identical wavelength or a different wavelength to the illumination light beam of the LIDAR unit.

Exemplary embodiment 5: Apparatus according to any one of the three preceding exemplary embodiments, wherein the LIDAR unit includes at least one illumination apparatus, wherein the illumination apparatus is configured to generate the at least one illumination light beam, and wherein the LIDAR unit includes at least one modulation unit, which is configured to modulate the illumination light beam.

Exemplary embodiment 6: Apparatus according to any one of the four preceding exemplary embodiments, wherein the modulation is an amplitude modulation.

Exemplary embodiment 7: Apparatus according to any one of the five preceding exemplary embodiments, wherein the apparatus includes at least one detector, wherein the detector is arranged on the tracked measuring device, and wherein the detector is configured to determine the information item about the modulation of the illumination light beam.

Exemplary embodiment 8: Apparatus according to any one of the preceding exemplary embodiments, wherein the synchronization information item includes an information item about a modulation of at least one light beam propagating from the tracked measuring device to the LIDAR unit.

Exemplary embodiment 9: Apparatus according to the preceding exemplary embodiment, wherein the apparatus includes a plurality of further illumination devices, which are arranged on the tracked measuring device, wherein the further illumination devices are configured to generate a plurality of light beams that propagate from the tracked measuring device to the LIDAR unit.

Exemplary embodiment 10: Apparatus according to either of the two preceding exemplary embodiments, wherein the LIDAR unit is configured to receive the plurality of light beams propagating from the tracked measuring device to the LIDAR unit and to determine the information item about a modulation of the light beams propagating from the tracked measuring device to the LIDAR unit.

Exemplary embodiment 11: Apparatus according to either of the two preceding exemplary embodiments, wherein the plurality of light beams propagating from the tracked measuring device to the LIDAR unit have identical or different wavelengths and/or wherein the plurality of light beams propagating from the tracked measuring device to the LIDAR unit have an identical wavelength or different wavelengths to the illumination light beam of the LIDAR unit.

Exemplary embodiment 12: Apparatus according to any one of the preceding exemplary embodiments, wherein the tracked measuring device includes a plurality of modulable markers, wherein the modulable markers are each configured to influence a light beam, reflected to the LIDAR unit from the respective modulable marker, in such a way that a temporal relationship is generated between the LIDAR unit and the tracked measuring device.

Exemplary embodiment 13: Apparatus according to the preceding exemplary embodiment, wherein the modulable markers are each configured to influence the light beam reflected to the LIDAR unit from the respective modulable marker in such a way that a number and/or quality of the measurements of markers by the LIDAR unit changes.

Exemplary embodiment 14: Method for synchronizing data of at least one tracked measuring device and at least one LIDAR signal of a LIDAR unit tracking the tracked measuring device, wherein use is made of an apparatus including at least one LIDAR unit according to any one of the preceding exemplary embodiments, wherein the method includes the following steps:
a) generating at least one measurement signal with at least one measurement channel of the LIDAR unit in each case,
b) generating at least one LIDAR signal for the measurement signal and transferring the LIDAR signal to a control and evaluation unit, c) wirelessly receiving data from the tracked measuring device with the control and evaluation unit,
d) generating at least one synchronization signal, which is integrated at least in part in the at least one measurement channel of the LIDAR unit, and
e) temporally synchronizing the data of the tracked measuring device and of the LIDAR signal with the control and evaluation unit, taking account of the synchronization signal.

BRIEF DESCRIPTION OF THE DRAWINGS

The disclosure will now be described with reference to the drawings wherein.

DESCRIPTION OF EXEMPLARY EMBODIMENTS

Figure 1:
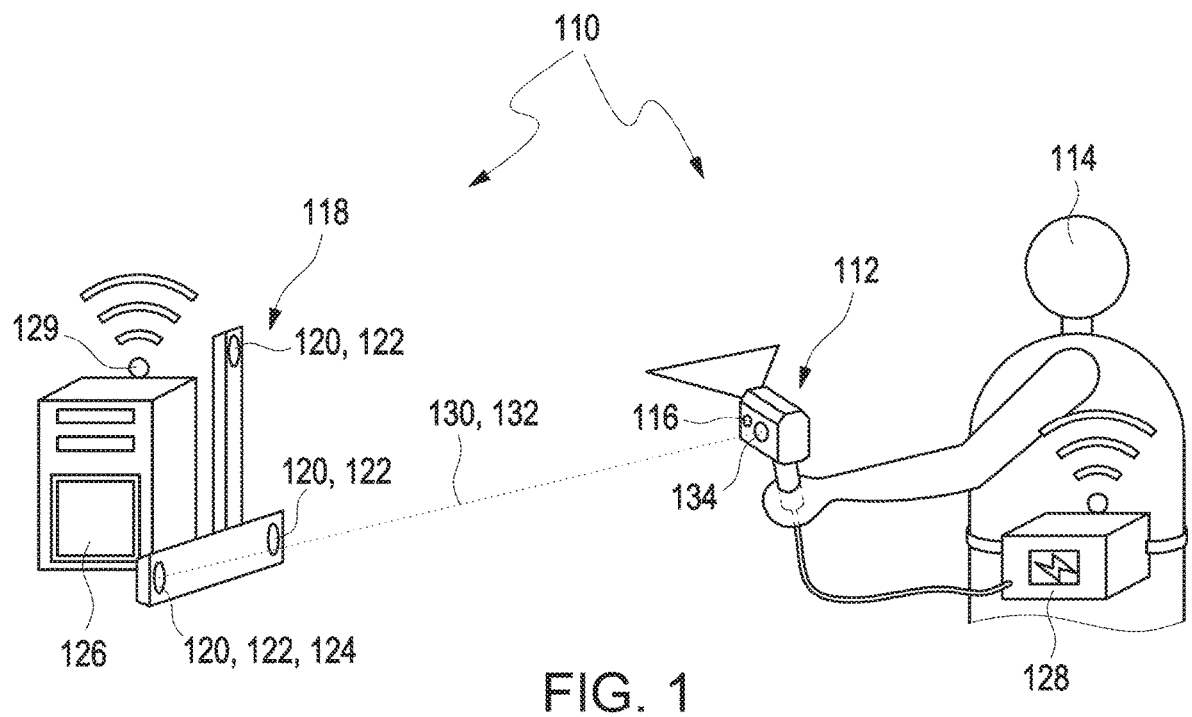
FIG. 1 shows a schematic illustration of an apparatus according to a first exemplary embodiment of the disclosure.

Further details and features of the disclosure will become apparent from the following description of exemplary embodiments. The respective features can be realized by themselves or as a plurality in combination with one another. The disclosure is not restricted to the exemplary embodiments. The exemplary embodiments are illustrated schematically in the figures. Identical reference numerals in the individual figures designate identical or functionally identical elements or elements corresponding to one another with regard to their functions.

FIG. 1 shows a schematic illustration of an apparatus 110 for determining at least one spatial position and orientation of at least one tracked measuring device 112 according to a first exemplary embodiment of the disclosure. The tracked measuring device 112 can be configured to scan a surface of an object to be measured, for example a component. The tracked measuring device 112 may include at least one sensor, which is configured to determine the 3D coordinates of the surface. The tracked measuring device 112 may include at least one scanner, more particularly a line scanner. The tracked measuring device 112 can be a hand-guided measuring apparatus, which can be guided by a user 114.

The apparatus 110 can be configured to track a movement of the measuring apparatus 112 at different times. In particular, the apparatus 110 can be configured for a continuous measurement of a 6D information item of the measuring apparatus 112 that is movable in space.

The measuring apparatus 112 may include at least three retroreflectors 116. By way of example, the retroreflectors 116 can be markers. The retroreflectors 116 can be selected from the group consisting of: a cat's eye, spherical lenses with a reflection layer, a marker as described in US 2011/0007326 A1, US 2013/0050410 A1, or US 2017/0258531 A1, the content of which is herewith incorporated into this application, a cube prism, and a corner cube. The retroreflectors 116 can be arranged on the measuring apparatus 112 in secured and/or interchangeable fashion. A position of the retroreflectors 116 on the measuring apparatus 112 can be known. The measuring apparatus 112 may have a plurality of retroreflectors 116, in particular more than three retroreflectors 114, for example four, five, six, or more retroreflectors 116.

The apparatus 110 includes at least one LIDAR unit 118. The LIDAR unit 118 has at least one measurement channel 120. The LIDAR unit 118 can have a plurality of measurement channels 120, for example two, three, four, five, or more measurement channels. The measurement channels 120 can be configured identically or differently. The measurement channels 120 can be configured at least partly separated from one another in space and/or time.

The LIDAR unit 118 can have at least one illumination apparatus 122, which is configured to generate at least one frequency modulated illumination light beam. The LIDAR unit 118 can be configured to generate the illumination light beam, the frequency of which is tuned continuously, according to the FMCW method. By way of example, the frequency of the illumination light beam can be linearly modulated with time. In principle, a combination of LIDAR method and FMCW method is known to a person skilled in the art, for example from Chip-scale Lidar, Benham Behroozpur Baghmisheh, Technical Report No. UCB/EECS.2017-4. By way of example, the LIDAR unit 118 can be configured like in U.S. Pat. No. 9,559,486 B2, U.S. Pat. No. 8,913,636 B2, or US 2016/123718 A1.

The illumination apparatus 122 can have at least one light source. The illumination apparatus 122 can have at least one FMCW light source. The illumination apparatus 122 can have at least one adjustable (tuneable) laser source, for example at least one distributed feedback (DFB) laser diode or a distributed Bragg reflector (DBR) laser diode.

The measurement channel 120 is configured to generate at least one measurement signal. The measurement signal of the measurement channel 120 can be an output light beam of the measurement channel 120. The LIDAR unit 118 can have at least one sensor element 124, which is configured to detect the measurement signal of the measurement channel 120. The sensor element 124 can have at least one photodiode.

The LIDAR unit 118 is configured to generate at least one LIDAR signal for the measurement signal. In particular, the LIDAR unit 118 is configured to generate at least one LIDAR signal for each measurement channel 120. The LIDAR unit 118 can be configured to generate a reference light beam. The LIDAR unit 118 can have at least one reference arm. The reference light beam can be a current illumination light beam which is supplied to the sensor element 124 via the reference arm of the LIDAR unit 118, for example. The sensor element 124 can be configured to superpose the measurement signal of the measurement channel 120 on the reference light beam. The LIDAR signal can be a signal in which the reference light beam is superposed on the measurement signal of the measurement channel 120. The LIDAR signal can be a frequency spectrum of a beat signal of the reference light beam, on which the measurement signals have been superposed. The LIDAR unit 118 can be configured to superpose the reference light beam on at least one measurement signal and determine a frequency spectrum of an arising beat signal. The LIDAR unit 118 can be configured to superpose the measurement signals, for example the measurement signals of the three measurement channels 120, for example by a beam splitter. The LIDAR unit 118 can be configured to superpose the reference light beam on the superposed measurement signals and determine a frequency spectrum of an arising beat signal. The LIDAR unit 118 can be configured to determine at least three peaks in the frequency spectrum for each retroreflector 116 and determine the spatial position and orientation of the measuring apparatus 112 therefrom.

The apparatus 110 includes at least one control and evaluation unit 126. The control and evaluation unit 126 can be configured to determine the spatial position and orientation of the measuring apparatus 112 from the LIDAR signal. By way of example, one or more electronic connections between the measurement channel 120, in particular the sensor element 124, and the control and evaluation unit 126 can be provided for this purpose. The control and evaluation unit 126 can include for example at least one data processing apparatus, for example at least one computer or microcontroller. The data processing apparatus can have one or more volatile and/or non-volatile data memories, wherein the data processing apparatus can be configured for example in terms of programming to drive the sensor element 124. The control and evaluation unit 126 can furthermore include at least one interface, for example an electronic interface and/or a human-machine interface such as, for example, an input/output apparatus such as a display and/or a keyboard. The control and evaluation unit 126 can be constructed for example centrally or else in a decentralized manner. Other configurations are also conceivable. The control and evaluation unit 126 can include at least one A/D converter.

The control and evaluation unit 126 can be configured to determine the spatial position and orientation of the measuring apparatus 112 from the LIDAR signal. The control and evaluation unit 126 can be configured to determine a frequency spectrum of the LIDAR signal, in particular the beat signal, by a Fourier transform. The frequency spectrum can have a plurality of maximums, so-called peaks. The control and evaluation unit 126 can be configured to identify the peaks in the frequency spectrum. By way of example, the control and evaluation unit 126 can be configured to identify at least nine peaks in the case of a parallel measurement in three measurement channels 120. A spatial position of the three retroreflectors 116 can be determined from the information items about the exact distribution and/or arrangement of the peaks. A 3D point can be determined from three lengths in different directions. A complete 6D information item can be determined in the case of a known arrangement of the retroreflectors 116 on the measuring apparatus 112.

The LIDAR unit 118 is configured to transfer the LIDAR signal to the control and evaluation unit 126. By way of example, for this purpose provision can be made of one or more connections, in particular wired and/or wireless connections, between the LIDAR unit 118 and the control and evaluation unit 126. The data transfer between the control and evaluation unit 126 and the LIDAR unit 118 can be bidirectional. The control and evaluation unit 126 and/or the LIDAR unit 118 may include at least one transmission apparatus and/or at least one reception unit.

The tracked measuring device 112 may be configured to transmit data, in particular captured object data, to the control and evaluation unit 126. The tracked measuring device 112 may include, for example, at least one transmission apparatus 128, which is configured to transmit data to the control and evaluation unit 126, in particular in wireless fashion. The control and evaluation unit 126 includes the at least one reception unit 129, illustrated symbolically here, which is configured to receive data from the tracked measuring device 112 in wireless fashion. The tracked measuring device 112 may include the at least one transmission apparatus 128, which is configured for wireless data transfer. The wireless data transfer may use any wireless data transfer method, for example Bluetooth, WLAN (Wireless Local Area Network), 4G (LTE, Long Term Evolution), 5G (Next Generation Mobile Networks). By way of example, the data transfer can be realized by conventional WLAN component parts. The data transfer between the control and evaluation unit 126 and the tracked measuring device 112 can be bidirectional. Thus, the control and evaluation unit 126 may include at least one transmission apparatus and the tracked measuring device 112 may include at least one reception unit.

The apparatus 110 has at least one synchronization channel 130. The synchronization channel 130 can use at least one light beam with a wavelength in the optical spectrum. The synchronization channel 130 is integrated, at least in part, in the measurement channel 120. The synchronization channel 130 can use at least one optical component of the measurement channel 120. In particular, the synchronization channel 130 and the measurement channel 120 may have an at least partly identical light path. In the case of a plurality of measurement channels, the synchronization channel 130 and at least one of the measurement channels 120, in particular, may have an at least partly identical light path.

As shown in FIG. 1, the synchronization channel 130 may be integrated in full in at least one of the measurement channels 120. The synchronization channel 130 is configured to determine at least one synchronization information item.

By way of example, the synchronization information item may include an information item about a modulation of at least one illumination light beam 132. By way of example, the illumination light beam 132 can be an illumination light beam of the LIDAR unit 118. The LIDAR unit 118 can have at least one illumination apparatus 122. The illumination apparatus 122 can be configured to generate the at least one illumination light beam 132. The LIDAR unit 118 can have at least one modulation unit, which is configured to modulate the illumination light beam 132. By preference, the modulation can be an amplitude modulation. The apparatus 110 can include at least one detector 134, for example at least one photodetector. The at least one detector 134 can be arranged on the tracked measuring device 112, in particular on a surface of the tracked measuring device 112. The detector 134 can be configured to determine the information item about modulation of the illumination light beam 132. Since the LIDAR unit 118 attempts to direct the illumination light beams of the LIDAR unit 118 exactly on the tracked measuring device 112, an optimal signal-to-noise ratio for determining the information item about the modulation of the illumination light beam 132 can be ensured without further measures.

Figure 2:
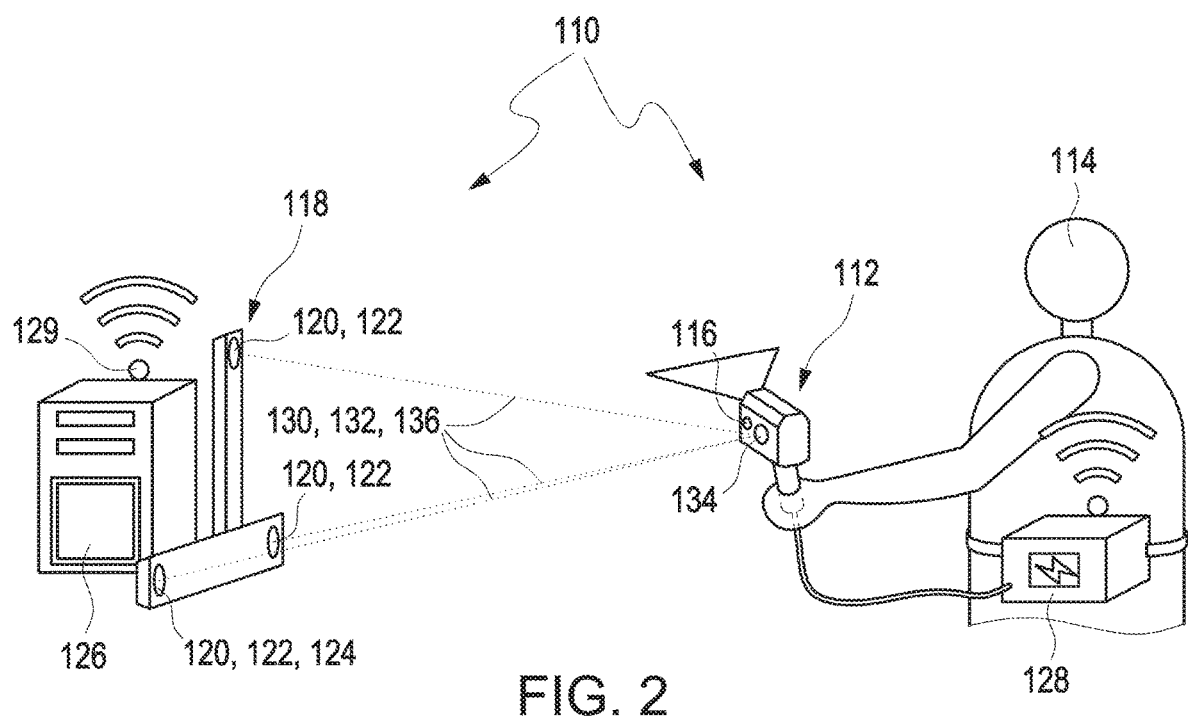
FIG. 2 shows a schematic illustration of the apparatus according to a second exemplary embodiment of the disclosure.

As shown in FIG. 2, the illumination light beam 132 can be a separate light beam 136 that has an identical light path as the illumination light beam of the LIDAR unit 118. The separate light beam 136 can have an identical wavelength or a different wavelength in relation to the illumination light beam of the LIDAR unit 118. In this exemplary embodiment, light beams of a separate illumination apparatus that use the same light path to the tracked measuring device 112 as the illumination light beam of the LIDAR unit 118 can be modulated. Using an identical light path can be advantageous since the determination of the synchronization information item may profit from beam tracking by the LIDAR unit 118. This can guarantee an optimal signal quality.

Figure 3:
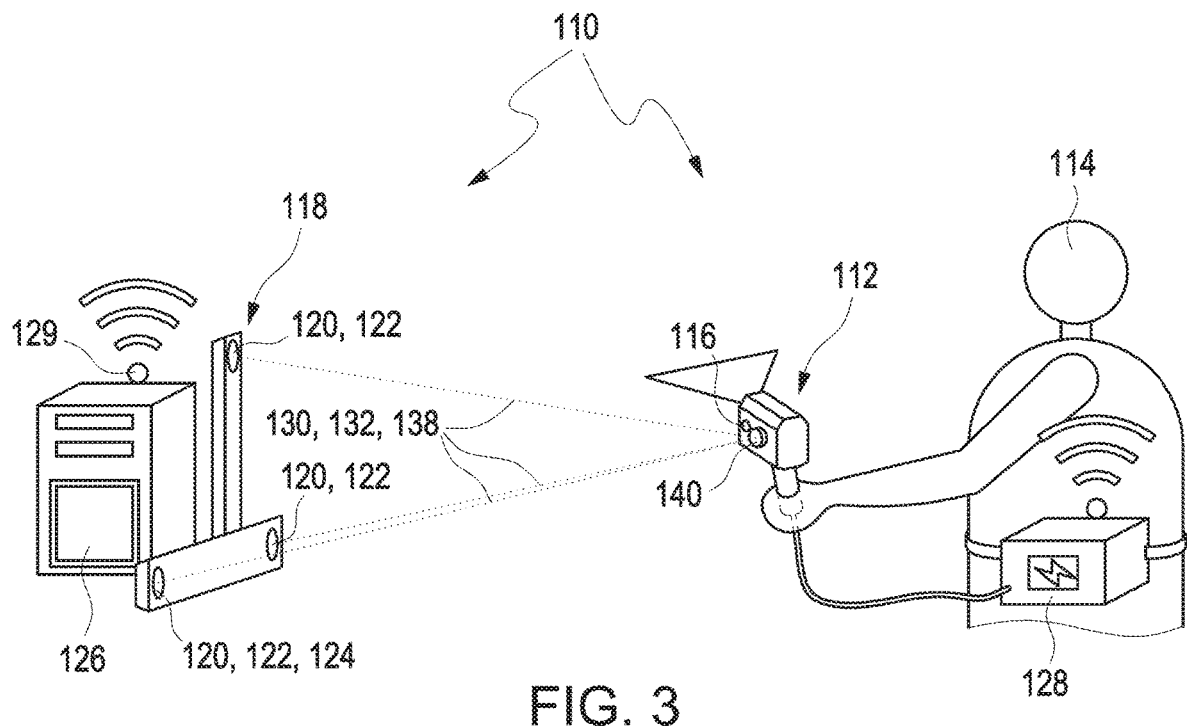
FIG. 3 shows a schematic illustration of the apparatus according to a third exemplary embodiment of the disclosure.

FIG. 3 shows an exemplary embodiment in which the synchronization information item includes an information item about a modulation of at least one light beam 138 propagating from the tracked measuring device 112 to the LIDAR unit 118. The apparatus 110 can have a plurality of further illumination devices 140, which are arranged on the tracked measuring device 112. The further illumination devices 140 can be configured to generate a plurality of light beams 138 propagating from the tracked measuring device 112 to the LIDAR unit 118. The LIDAR unit 118 can be configured to receive the plurality of light beams 138 propagating from the tracked measuring device 112 to the LIDAR unit and to determine the information item about a modulation of the light beams 138 propagating from the tracked measuring device 112 to the LIDAR unit 118. By way of example, the further illumination devices 140 can be arranged in such a way that at least one illumination apparatus 140 is captured in every trackable alignment of the tracked measuring device 112. An emission angle can be chosen in such a way that light from at least one of the further illumination devices 140 is captured in every trackable alignment of the tracked measuring device 112. The light beams 138 generated by the further illumination devices 140 of the tracked measuring device 112 may use the same the light path from the tracked measuring device 112 to the LIDAR unit 118 as the light beams reflected by the retroreflectors 116. In this way, it is possible to profit from the beam tracking by the LIDAR unit 118. In the LIDAR unit 118, the light beams 138 generated by the further illumination devices 140 of the tracked measuring device 112 can be captured by the above-described sensor elements 124 of the LIDAR unit 118, in particular at an identical wavelength as the illumination light beams of the LIDAR unit 118, or by further separate detectors. The plurality of light beams 138 propagating from the tracked measuring device 112 to the LIDAR unit 118 can have identical or different wave-lengths and/or the plurality of light beams 138 propagating from the tracked measuring device 112 to the LIDAR unit 118 can have an identical wavelength or different wave-lengths to the illumination light beam of the LIDAR unit 118.

Figure 4:
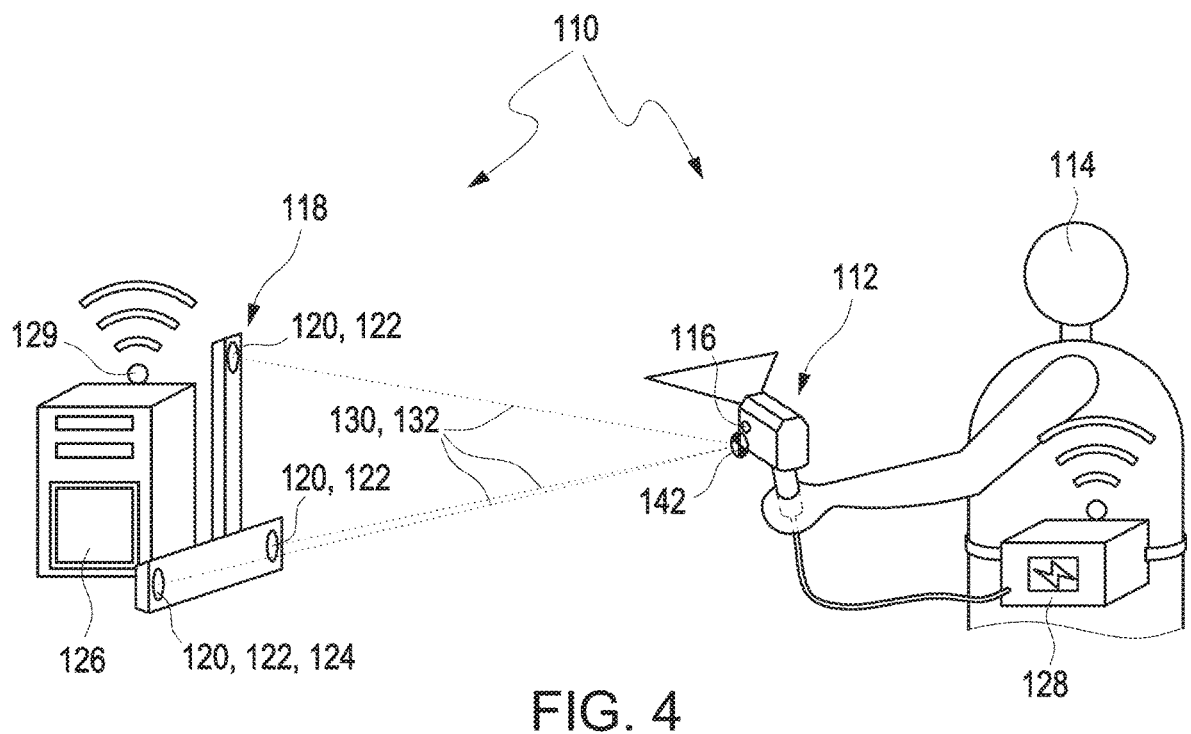
FIG. 4 shows a schematic illustration of the apparatus according to a fourth exemplary embodiment of the disclosure.

FIG. 4 shows an exemplary embodiment in which the tracked measuring device 112 has a plurality of modulable markers 142. The modulable markers 142 may each be configured to influence a light beam reflected to the LIDAR unit 118 from the respective modulable marker 142 in such a way that a temporal relationship between the LIDAR unit 118 and tracked measuring device 112 is generated. The modulable markers 142 can each be configured to influence the light beam reflected to the LIDAR unit 118 from the respective modulable marker 142 in such a way that a number and/or quality of the measurements of markers 142 by the LIDAR unit 118 changes. The number of modulable markers 142 can be such that it is possible to ensure that at least one modulable marker 142 can be captured in any alignment of the tracked measuring device 112. This allows a measurement of markers by the LIDAR unit 118 to be influenced in a targeted fashion by the tracked measuring device 112. This allows a common temporal relationship between the LIDAR unit 118 and the tracked measuring device 112 to be established. An accuracy of the temporal relationship can depend on a measurement rate of the LIDAR unit 118.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

110 Apparatus
112 Tracked measuring device
114 User
116 Retroreflector
118 LIDAR unit
120 Measurement channel
122 Illumination apparatus
124 Sensor element
126 Control and evaluation unit
128 Transmission apparatus
129 Reception unit
130 Synchronization channel
132 Illumination light beam
134 Detector
136 Separate light beam
138 Light beam
140 Further illumination apparatus
142 Modulable marker

What is claimed is:

1. An apparatus for determining at least one spatial position and orientation of at least one tracked measuring device, the apparatus comprising:
    at least one light detection and ranging (LIDAR) unit having at least one measurement channel, the at least one measurement channel being configured to generate at least one measurement signal;
    at least one control and evaluation unit including at least one reception unit configured to receive data from the at least one tracked measuring device in wireless fashion, wherein the data is acquired when the at least one tracked measuring device probes a test object;
    the LIDAR unit being configured to generate at least one LIDAR signal for the at least one measurement signal and to transfer said at least one LIDAR signal to the at least one control and evaluation unit;
    the apparatus having at least one synchronization channel integrated at least in part into the at least one measurement channel of the LIDAR unit, the at least one synchronization channel being configured to determine at least one synchronization information item, wherein the at least one synchronization information item includes information about a temporal relationship between data acquired by the at least one tracked measuring device and the at least one LIDAR signal; and
    the at least one control and evaluation unit being configured to temporally synchronize the data of the at least one tracked measuring device and the at least one LIDAR signal based on the at least one synchronization information item,
    wherein the at least one tracked measuring device includes at least three retroreflectors for determining the at least one spatial position and orientation of at least one tracked measuring device.

2. The apparatus of claim 1, wherein the at least one synchronization information item includes an information item about a modulation of at least one illumination light beam.

3. The apparatus of claim 2, wherein:
    the at least one illumination light beam is an illumination light beam of the LIDAR unit, and/or
    the at least one illumination light beam is a separate light beam, which has a light path identical to the illumination light beam of the LIDAR unit.

4. The apparatus of claim 2, wherein the modulation of the at least one illumination light beam is an amplitude modulation.

5. The apparatus of claim 2, further comprising:
at least one detector arranged on the at least one tracked measuring device and configured to determine information items about the modulation of the at least one illumination light beam.

6. The apparatus of claim 1, wherein the at least one synchronization information item includes an information item about a modulation of at least one light beam propagating from the at least one tracked measuring device to the LIDAR unit.

7. The apparatus of claim 1, further comprising:
a plurality of illumination devices arranged on the at least one tracked measuring device and configured to generate a plurality of light beams that propagate from the at least one tracked measuring device to the LIDAR unit.

8. The apparatus of claim 7, wherein the LIDAR unit is configured to receive the plurality of light beams propagating from the at least one tracked measuring device to the LIDAR unit and to determine an information item about a modulation of light beams propagating from the at least one tracked measuring device to the LIDAR unit.

9. The apparatus of claim 1, wherein:
the at least one tracked measuring device includes a plurality of modulable markers, and
each of the plurality of modulable markers is configured to influence a light beam reflected to the LIDAR unit from the respective modulable marker such that a temporal relationship is generated between the LIDAR unit and the at least one tracked measuring device.

10. A method for synchronizing data of the at least one tracked measuring device and the at least one LIDAR signal of the at least one LIDAR unit tracking the at least one tracked measuring device with the apparatus of claim 1, the method comprising:
(a) generating the at least one measurement signal with the at least one measurement channel of the LIDAR unit in each case;
(b) generating the at least one LIDAR signal for the at least one measurement signal and transferring the at least one LIDAR signal to the at least one control and evaluation unit;
(c) wirelessly receiving the data from the at least one tracked measuring device with the at least one control and evaluation unit;
(d) generating at least one synchronization signal which is integrated at least in part in the at least one measurement channel of the LIDAR unit; and
(e) temporally synchronizing the data of the at least one tracked measuring device and of the at least one LIDAR signal with the at least one control and evaluation unit by taking into account the at least one synchronization signal.

* * * * *